Patented Oct. 17, 1922.

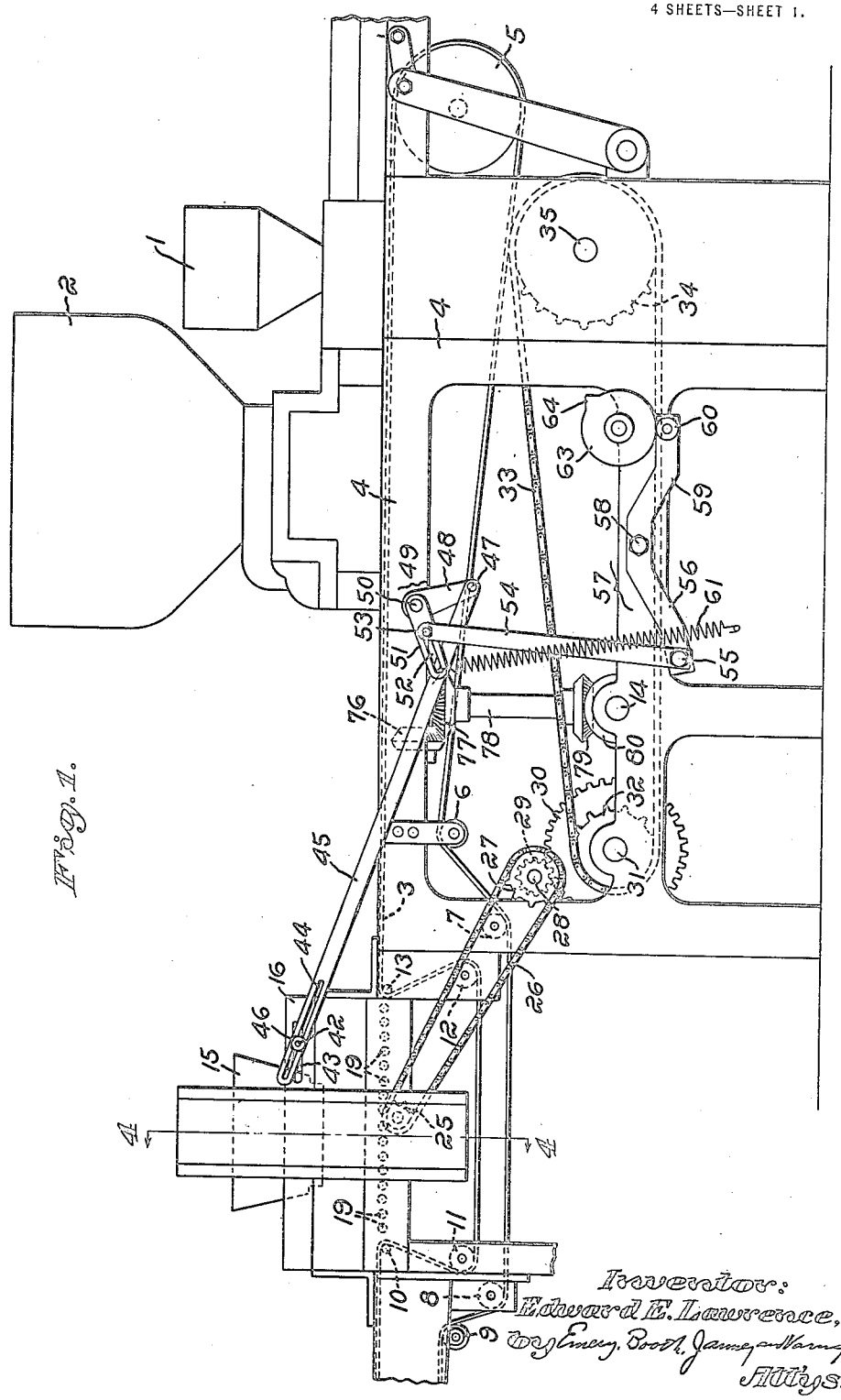

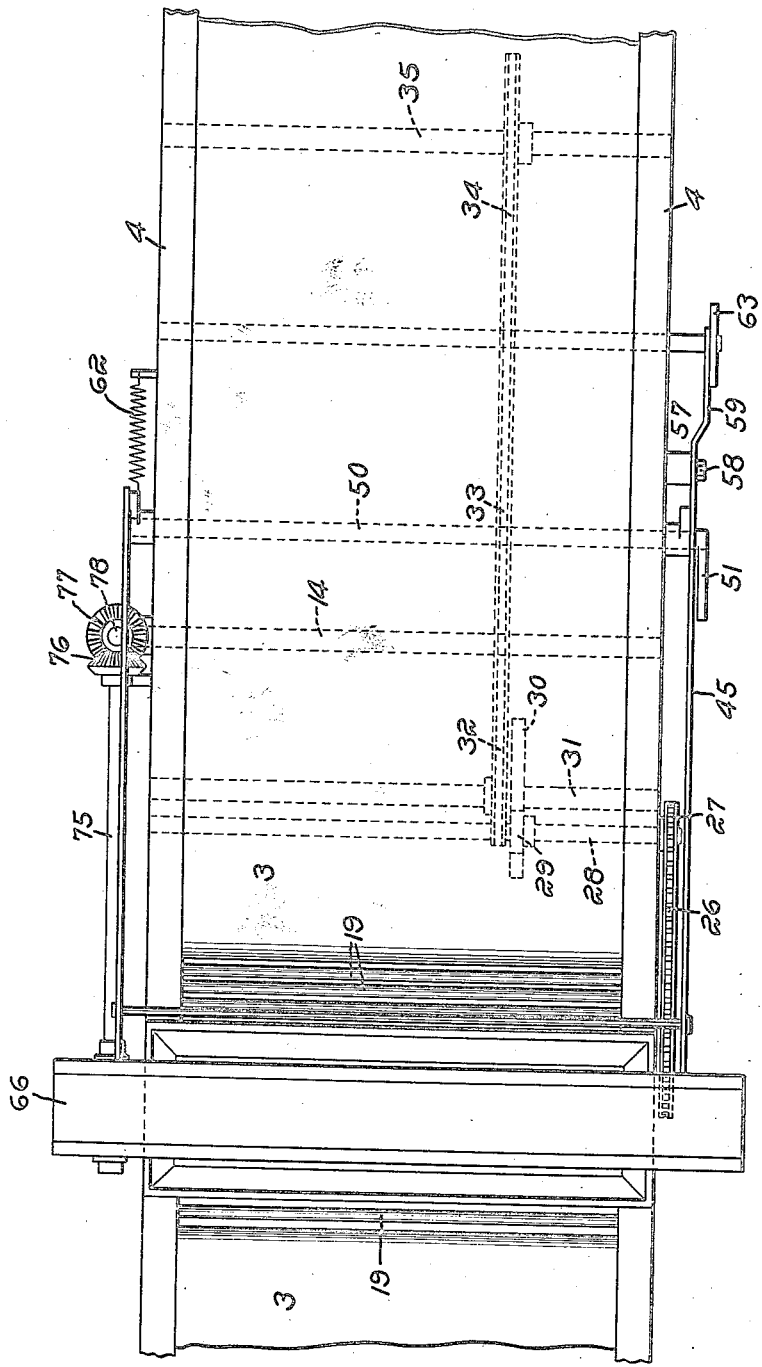

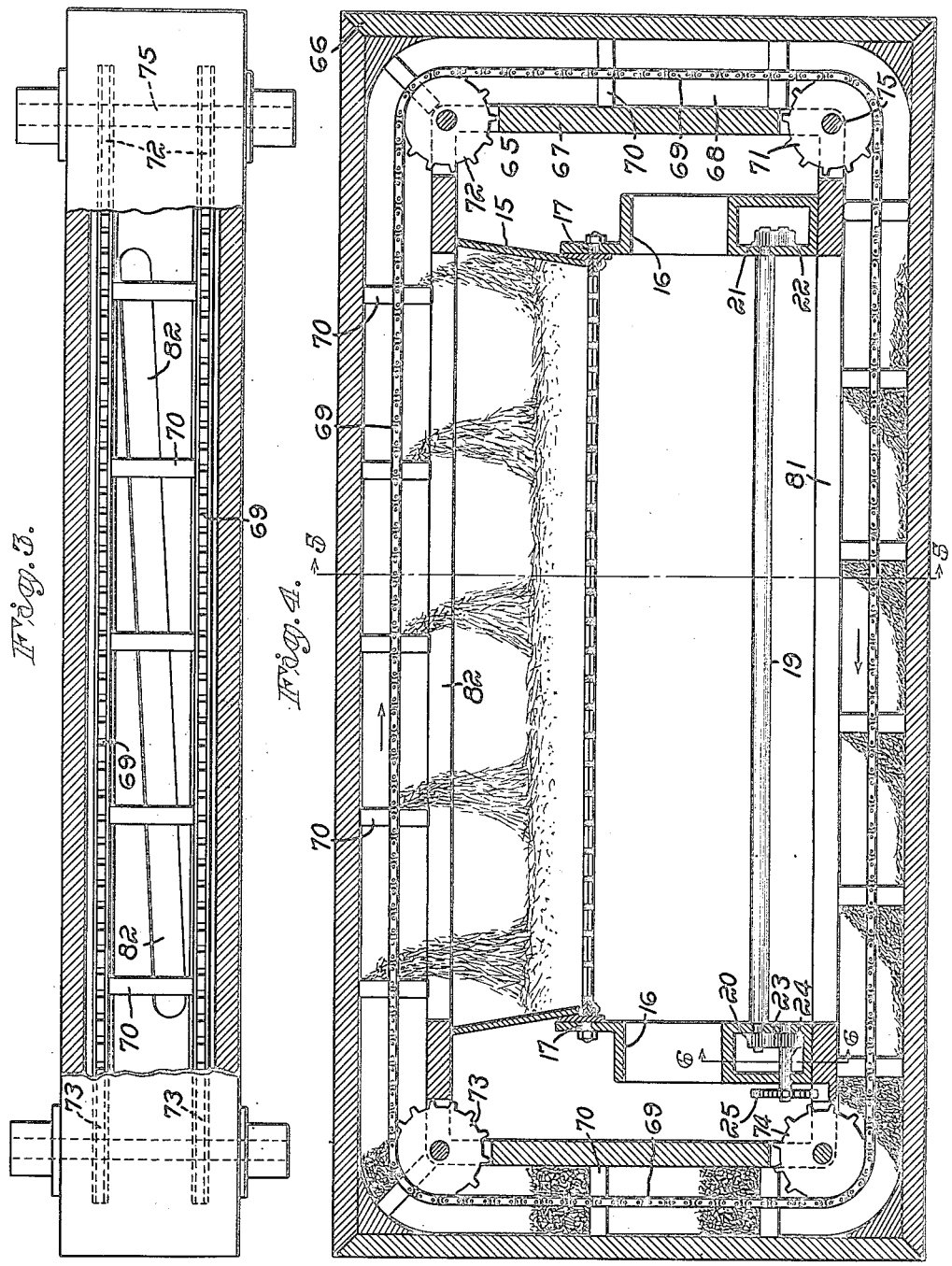

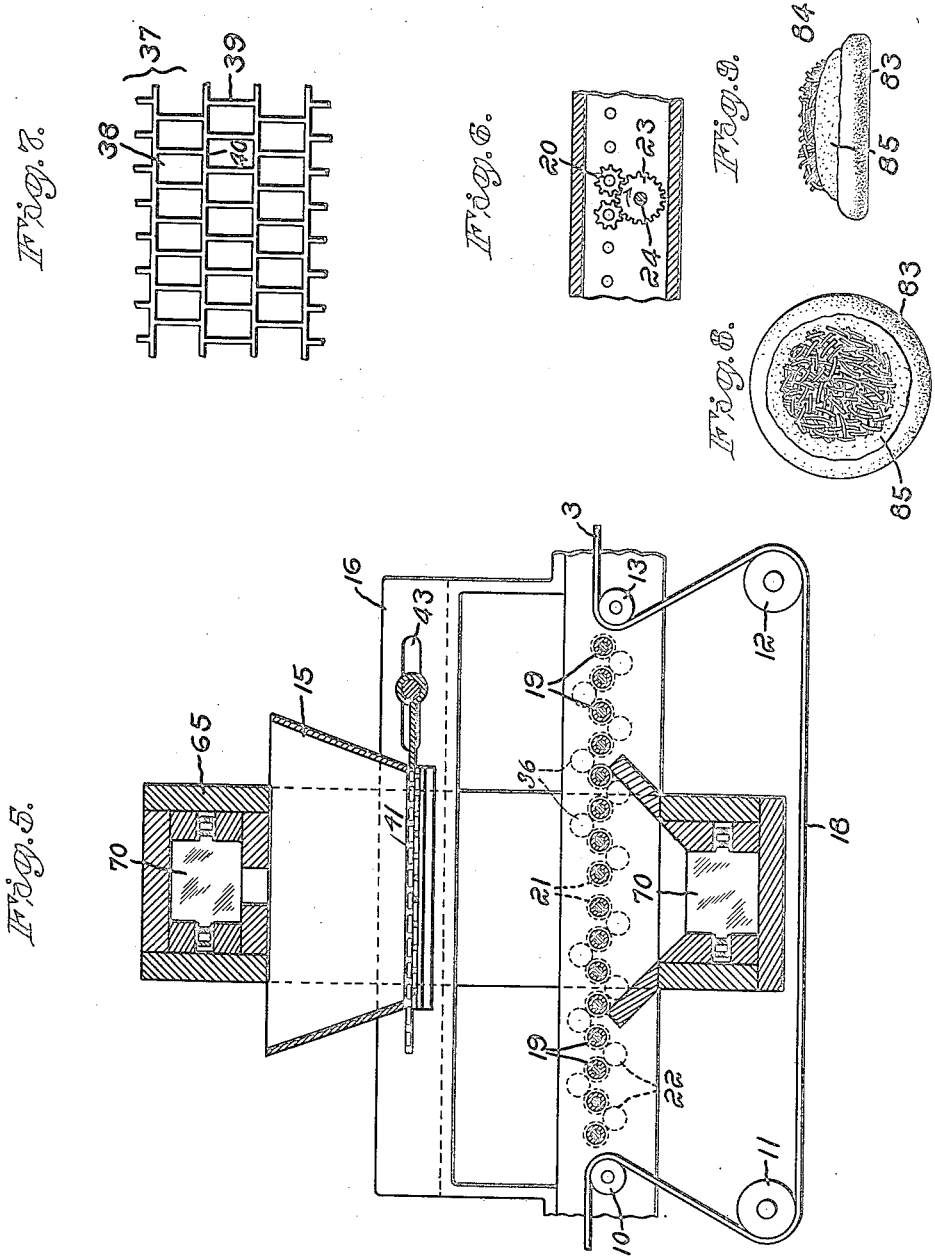

1,432,701

UNITED STATES PATENT OFFICE.

EDWARD E. LAWRENCE, OF JAMAICA, NEW YORK, ASSIGNOR TO LOOSE-WILES BISCUIT COMPANY, OF LONG ISLAND CITY, NEW YORK, N. Y., A CORPORATION OF NEW YORK.

MECHANISM FOR DEPOSITING COATING UPON CAKES, ETC.

Application filed August 20, 1919. Serial No. 318,686.

*To all whom it may concern:*

Be it known that I, EDWARD E. LAWRENCE, a citizen of the United States, and a resident of Jamaica, in the county of Queens and State of New York, have invented an Improvement in Mechanism for Depositing Coating upon Cakes, Etc., of which the following description, in connection with the accompanying drawings, is a specification, like characters on the drawings representing like parts.

This invention relates to mechanism for depositing coating upon cakes, wafers or other food products.

In order that the principle of the invention may be readily understood, I have disclosed a single embodiment thereof in the accompanying drawings, wherein—

Fig. 1 is a side elevation of a coating machine embodying my invention and particularly adapted to deposit marshmallow or a like substance upon cakes and to apply a sprinkling or deposit of cocoanut upon the marshmallow coating;

Fig. 2 is a plan view of the mechanism shown in Fig. 1;

Fig. 3 is a view, partly in plan and partly in horizontal section, of means for reconveying the cocoanut or other shredded material to the hopper;

Fig. 4 is a vertical section of such reconveying means with the hopper and related parts and taken on the line 4—4 of Fig. 1;

Fig. 5 is a vertical transverse section taken through the hopper, the reconveying means and the cake conveying means beneath the hopper on the line 5—5, Fig. 4;

Fig. 6 is a detail in vertical section representing means for driving a part of the cake conveying means;

Fig. 7 is a detail in plan of a part of the screen through which the cocoanut or other shredded material is deposited upon the cakes, and Figs. 8 and 9 respectively are a plan view and a side elevation of the completed product.

In the patent to Legler No. 1,260,558, dated March 26, 1918, there are disclosed means for depositing upon cakes or other food products first a jelly like substance and then superimposing upon the jelly an icing or marshmallow or other suitable substance. Preferably, but not necessarily, my invention is employed in connection with a mechanism of the general type shown in the Legler patent. That is, I preferably, though not necessarily, deposit some suitable coating material upon cakes or other food products, and then upon such coating I deposit cocoanut or some other or like shredded material. While according to the Legler patent, there is first deposited a jelly-like substance and then a coating of marshmallow is superimposed thereon, it is obvious that my invention may be employed in connection with apparatus for depositing any suitable coating upon cakes or other food products. It is also within the scope and purpose of my invention to deposit shredded or other material upon cakes or other food products whether or not a coating has previously been applied to such cakes or other food products.

It has heretofore been proposed to sprinkle cocoanut upon food products, but so far as I am aware it has been done only by hand. This operation has not been successful. Not only is it wasteful and expensive both as to time and help, but the deposits have been made unevenly and otherwise unsatisfactory. I have provided means whereby for the first time so far as I am aware cocoanut or other shredded material is deposited evenly upon food products.

In Fig. 1, I have represented in outline a receptacle 1 which is preferably similar to a receptacle shown in the said Legler patent for depositing jelly-like substance upon the cakes. At 2 I have similarly indicated a larger receptacle that may contain marshmallow and is preferably similar to the corresponding receptacle in the Legler patent. Both of these receptacles are provided with valve means for permitting the periodic discharge of the material upon the transverse rows of cakes or the like that are received upon an apron 3 that is supported upon the framing indicated generally at 4 and is intermittently driven by means not herein necessary to describe, but which is preferably similar to that shown in the said Legler patent. The apron 3 passes about a drum 5 and also about a series of guide rolls 6, 7, 8, 9, 10, 11, 12, 13 suitably supported in the framing. The apron 3 is driven in any suitable manner from the main drive shaft 14, and preferably as disclosed in said patent. Preferably also I provide pusher mechanism which may be similar to that shown in the Legler patent by means of which transverse rows of cakes are positioned upon the apron 3 and are fed therealong beneath the receptacles 1 and 2, being there held stationary while the suitable deposits are made thereon.

At a suitable point beyond the receptacles 1 and 2 I provide a hopper or receptacle 15 that is supported at its ends upon the framing of the machine by means of brackets or castings 16, 16 preferably of the general form shown. Each of the brackets 16 is longitudinally slotted as indicated at 17 to permit longitudinal adjustment of the hopper or receptacle 15. The hopper 15 is supported a suitable distance above the plane of the apron 3 which, as indicated most clearly in Figs. 1 and 5, is guided downwardly about the guide roll 13 to and about the guide roll 12, so as to bring the part 18 of the apron 3 into a lower plane. In the plane of the upper run of the apron 3, I provide suitable means for conveying the cakes beneath the hopper 15 and traveling at the same speed as said apron 3 but intermittently. While for this purpose, any suitable means may be provided I have herein represented a series of rods 19 that are suitably supported at their ends in the brackets 16, as most clearly shown in Fig. 4. The said rods 19 which may be formed of wood or other suitable material are provided at their opposite ends with pinions 20, 21, the pinions 21 meshing with idler gears 22 to prevent twisting of the rods. The rods are preferably driven from one end only, and for that purpose I have represented one of the pinions 20 as having meshing therewith a driving gear 23 upon a short shaft 24 carrying at its outer end a sprocket gear 25 driven by a sprocket chain 26 passing about a sprocket gear 27 upon a short shaft 28 and carrying a pinion 29 driven from the gear 30 upon the shaft 31. The shaft 31 has fast thereon a sprocket gear 32 driven by a sprocket chain 33 passing about a sprocket gear 34 upon the shaft 35, which is driven intermittently from the main drive shaft. The construction and arrangement are such that the apron 3 is driven intermittently and the rods 19 are driven intermittently at the same speed, and at the same time, whereby the coated cakes that are intermittently delivered from the apron 3 onto the rods 19 are intermittently conveyed by said rods beneath the hopper 15 and are held stationary beneath said hopper for the reception of the cocoanut or other shredded material. I provide pinions 36 between and meshing with the pinions 20 whereby all the rods 19 are driven in the same direction. The said rods are spaced sufficiently apart to permit the excess cocoanut or other shredded material to be passed therebetween, but are close enough together to feed the cakes intermittently as described. At the bottom of the hopper 15 I provide a stationary screen 37, a portion of which is shown in detail in Fig. 7. The meshes 38 thereof are relatively large and of a rectangular shape having transversely extending bars 39 joined by shorter longitudinal members 40. Closely overlying the screen 37 is preferably an identical screen 41 which is adapted to be reciprocated upon the screen 37. In view of the fact that I preferably use a comparatively coarse or shredded material like cocoanut, it is unnecessary at any time wholly to close the meshes in the screens, although this may be done within the scope of my invention, as by employing screens having other arrangement or size of meshes. In the construction shown when the upper screen 41 is in open position, the bars 39 thereof register with the bars 39 of the screen 37, so that the openings 38 are brought into register and the cocoanut material passes readily therethrough. In the closed position of the screens, the bars 39 of the upper screen 41 are brought into a position midway between the bars 39 of the lower screen 37. This prevents the discharge of the cocoanut or like material.

I provide suitable means whereby the screen may be placed in its open or discharge position at the same time that the rods 19 and the apron 3 are stopped, and whereby the screen is closed while the rods 19 and the apron 3 are traveling. Thus, the cocoanut or other material is deposited upon the cakes while they are stationary. While for this purpose any suitable means may be provided, I have herein represented the upper screen 41 as having a transversely extending rod 42 adapted to move to and fro in longitudinally extending slots 43 formed in the brackets or castings 16. At its ends the rod 42 passes through longitudinal slots 44 in rods or elongated links 45. Upon its ends the rod 42 is provided with nuts 46, whereby the links 45 may be tightly held against co-acting nuts upon the inner faces of the rods or links 45. A movement of reciprocation is imparted to the rods or links 45 in any suitable manner. Herein for the purpose, each of them is pivotally secured at 47 at the side of the framing to an arm 48 of a lever 49 pivoted upon a through shaft 50. One of said levers 49 is provided with an arm 51 having a slot 52 in which is suitably secured at 53 a link 54 itself pivoted at its lower end at 55 to the arm 56 of a lever 57 itself pivoted at 58 and having an arm 59 provided with a roll 60 adapted to be held by a coil spring 61 shown in Fig. 1 and also by a coil spring 62, shown in Fig. 2, in engagement with the periphery of a cam 63 having thereon a projection 64. In the rotation of the cam 63 the projection 64 rocks the lever 57 and through the described connection reciprocates the rods or links 45 so as alternately to open and close the screen. In this or in any other similar manner, the material is discharged from the hopper 15 onto the cakes supported therebeneath upon the rods 19.

Preferably I provide means whereby the material discharged from the hopper but not deposited upon the cakes and passing downwardly between the rods 19 is accumulated and reconveyed to the hopper 15. For this purpose any suitable means may be provided, but I have herein represented the following organization of parts.

About the hopper 15 I arrange a rectangular casing 65 shown most clearly in Figs. 4 and 5 as composed of a surrounding outer wall 66 and an inner wall 67 spaced sufficiently to provide a passageway 68 through which travels an endless belt or sprocket chain 69 having spaced blocks 70 and guided by rolls or drums or sprocket gears 71, 72, 73, 74 herein shown as placed at the corners of the rectangular casing 65. Preferably I positively drive the sprocket gear 71, and for that purpose herein represent it as fast upon a shaft 75, which, as shown in Fig. 2, is provided at its opposite end with a beveled gear 76 meshing with a similar gear 77 upon a vertical shaft 78, shown most clearly in Fig. 1, and having at its lower end a beveled gear 79 meshing with a similar gear 80 upon the main drive shaft 14. In this or in any other suitable manner the material which escapes downwardly between the bars 19 passes through a slot 81 in the casing 65 into the path of movement of the blocks 70 while on their lower run. The belt or sprocket chain 69 travels in the direction of the arrows adjacent thereto in Fig. 4 and the blocks 70 lift the surplus material, as indicated in said figure, and deposit it through an opening 82 in the upper inner wall 67 of the casing 65. Preferably and as indicated in Fig. 3, the slot 82 is inclined to the path of travel of the chain or belt 69, as in this way I get a more even distribution of the material along the entire length of the slot.

In Figs. 8 and 9 I have indicated at 83 the cakes or other food products having thereon the marshmallow deposit 84 and the cocoanut deposit 85.

Claims.

1. Mechanism for depositing coating on cakes and the like comprising an intermittently traveling conveyor, a hopper for shredded material, open, bodily stationary, rotatable means in substantial alignment with the receiving surface of said conveyor and positioned directly beneath said hopper, and means intermittently and in unison to impart movement to said conveyor to rotate said rotary means and to cause the stoppage of discharge of the shredded material from the hopper.

2. Mechanism for depositing coating on cakes and the like comprising an intermittently traveling conveyor, a hopper for coating material, open, bodily stationary, rotatable means in substantial alignment with the receiving surface of said conveyor and positioned directly beneath said hopper, and means intermittently and in unison to impart movement to said conveyor to rotate said rotary means and to cause the stoppage of discharge of the coating material from the hopper.

3. Mechanism for depositing coating on cakes and the like comprising an intermittently traveling conveyor, a hopper for coating material, open, bodily stationary, rotatable means in substantial alignment with the receiving surface of said conveyor, a screen controlling the discharge of material from the hopper, and means acting in unison to cause the stoppage of the traveling movement of the conveyor, the stoppage of rotation of said rotary means and the discharge of material from the hopper.

4. Mechanism for depositing coating on cakes and the like comprising in combination, a conveyor, a hopper for loose, solid material, an open conveying means beneath the hopper to receive the cakes or the like on the conveyor, means at times to maintain said conveying means stationary, and means to permit the discharge of said material through the action of gravity alone from the hopper onto the cakes while stationarily supported on said open conveying means.

5. Mechanism for depositing coating on cakes and the like comprising in combination, an apron-like conveyor and rotatable means onto which the cakes are directed from the conveyor and means to drive said conveyor and rotatable means intermittently.

6. Mechanism for depositing coating on cakes and the like comprising in combination, an apron like conveyor and open, bodily stationary means onto which the cakes are delivered from the conveyor, a hopper for shredded material positioned above said means and means to effect the intermittent discharge of said material from said hopper onto said cakes.

7. Mechanism for depositing coating on cakes and the like comprising in combination, an apron conveyor, rotatable rods onto which the cakes are delivered from the conveyor, and means positioned above said rods to deposit material intermittently upon the cakes.

8. Mechanism for depositing coating on cakes and the like comprising in combination, an apron conveyor, spaced rods onto which the cakes are delivered from the conveyor, means to rotate the rods and to drive the conveyor intermittently, and means to deliver material intermittently onto the cakes while supported on said rods.

9. Mechanism for depositing coating on cakes and the like comprising in combination, a conveyor, a hopper, means to discharge material intermittently from the hopper onto cakes on the conveyor, means to maintain stationary the conveyor only during the periods of intermittent discharge from the hopper, and means to re-convey to the hopper excess or unused material.

10. Mechanism for depositing coating on cakes and the like comprising in combination, a conveyor, spaced rotatable rods onto which the cakes are delivered from the conveyor, means intermittently to rotate said rods, a hopper above said spaced rods and reconveying means cooperating with the hopper.

11. Mechanism for depositing coating on cakes and the like comprising in combination, a conveyor, spaced rods onto which the cakes are delivered from the conveyor, means to rotate said rods, a hopper above the rods, reconveying means cooperating with the hopper, a screen for the hopper, and means intermittently to move said screen to discharging position.

12. Mechanism for depositing coating on cakes and the like comprising in combination, a conveyor, spaced rods onto which the cakes are delivered from the conveyor, means to move the conveyor intermittently, means to rotate the rods intermittently, a hopper above said rods, and means intermittently to discharge material onto cakes from the hopper.

13. Mechanism for depositing coating on cakes and the like comprising in combination, a conveyor, spaced rods onto which the cakes are delivered from the conveyor, means to move the conveyor intermittently, means to rotate the rods intermittently, a hopper above said rods, and means to discharge material from the hopper while said rods are stationary.

14. Mechanism for depositing coating on cakes and the like comprising in combination, a conveyor, spaced rods onto which the cakes are delivered from the conveyor, means to move the conveyor intermittently, means to rotate the rods intermittently, a hopper above said rods, and means to discharge material from the hopper onto cakes on the rods while the rods and the conveyor are stationary.

15. Mechanism for depositing coating on cakes and the like comprising in combination, conveyor means for the cakes, a hopper for shredded material, and screen means for the hopper comprising superposed screen members of relatively large mesh adapted to have the openings thereof brought into full register to discharge the material or to be brought into half register to prevent the discharge of the material.

16. Mechanism for depositing coating on cakes and the like comprising in combination, a conveyor, a hopper for material to be discharged on the cakes, guiding means for the conveyor to direct the same in a downward open loop, and an open receiving member positioned in said loop substantially in the plane of the conveyor and beneath the hopper.

17. Mechanism for depositing coating on cakes and the like comprising in combination, a conveyor apron having a part thereof guided in a downward, open loop, rotatable rods positioned in said loop in the plane of the upper run of the apron, means intermittently to drive said apron and to rotate said rods, a hopper located above said loop and means intermittently to discharge material from the hopper onto cakes on said rods.

18. Mechanism for depositing coating on cakes and the like comprising a conveyor therefor, a hopper wherein shredded material is loosely supported, and means to effect the intermittent discharge of said material upon the cakes on the conveyor and to prevent the discharge of said material between said intermittent discharges.

19. Mechanism for depositing coating on cakes and the like comprising a conveyor therefor, a hopper wherein shredded material is loosely supported, and means whereby the said material is discharged from the hopper through gravity alone periodically only.

20. Mechanism for depositing coating on cakes and the like comprising in combination, an apron like conveyor, open, bodily stationary means onto which the cakes are delivered from the conveyor, a hopper for shredded material positioned above said means, and means to move the cakes across said means only between the intermittent discharge of the material.

21. Means for depositing coating on cakes and the like comprising in combination, an intermittently traveling conveyor; open, bodily stationary, rotary means in substantial alignment with the receiving surface of the conveyor and toward which the cakes are discharged from the conveyor, a hopper for the coating material, and means acting simultaneously to cause the stoppage of said conveyor, the stoppage of the rotary movement of said rotary means and the discharge of coating material from said hopper, and also acting to cause the movement of the conveyor, the rotary movement of said rotary means and the stoppage of discharge of the coated material from said hopper.

22. Mechanism for depositing coating on cakes and the like comprising in combination, a conveyor, a hopper for loose, solid material, means periodically to stop the discharge of the material from said hopper, open conveying means beneath the hopper to receive the cakes or the like from the conveyor, said open conveying means consisting of rotatable rods, means intermittently to rotate said rods, and means to permit the discharge of said material through the action of gravity alone from the hopper onto the cakes while stationarily supported on said rods.

23. Mechanism for depositing coating on cakes or the like comprising in combination, a conveyor for the cakes of apron like form, a hopper for material to be discharged onto the cakes, guiding means for said conveyor to direct the same in a downward open loop, and an open receiving member positioned in said loop substantially in the plane of the conveyor and beneath said hopper, said open receiving member comprising spaced rods.

24. Mechanism for depositing coating on cakes and the like comprising in combination, an apron like conveyor for the cakes, a hopper to deliver material onto the cakes, said conveyor having a part guided in an open downward loop below said hopper, an open receiving member positioned in said loop substantially in the plane of the conveyor and beneath the hopper, and reconveying means to discharge the excess material into the hopper after its passage through the open receiving member.

25. Mechanism for depositing coating on cakes and the like comprising in combination, an apron like conveyor for the cakes, a hopper to deliver material onto the cakes, said conveyor having a part guided in an open downward loop below said hopper, an open receiving member positioned in said loop substantially in the plane of the conveyor and beneath the hopper, reconveying means to discharge the excess material into the hopper after its passage through the open receiving member, said reconveying means including an endless belt, a casing having a discharge opening above the hopper, and projections carried by the belt.

In testimony whereof, I have signed my name to this specification.

EDWARD E. LAWRENCE.